Aug. 1, 1950 — H. GELLMAN — 2,517,422
FOREHEAD LAMP DEVICE FOR DOCTORS
Filed April 24, 1948

INVENTOR.
Harold Gellman
BY Hugh S. Wertz
ATTORNEY

Patented Aug. 1, 1950

2,517,422

UNITED STATES PATENT OFFICE 2,517,422

FOREHEAD LAMP DEVICE FOR DOCTORS

Harold Gellman, Brooklyn, N. Y.

Application April 24, 1948, Serial No. 23,107

1 Claim. (Cl. 128—22)

This invention relates to lamp devices and more specifically to forehead lamp devices for doctors.

It is an object of this invention to provide a novel and improved forehead lamp device for doctors.

Patent 2,088,735, issued August 3, 1937, to Joseph Everhards, discloses an illuminating device mounted on a band adapted to fit on the forehead and is provided with optical means to throw a circular light onto the patient. The present invention, in its most important aspect, relates to the improvement of devices of the general type covered by the Everhards patent.

It is another object of this invention to provide a novel light-weight, easily manipulated forehead lamp device for doctors.

It is a further object of this invention to provide a forehead lamp device in which no metal part touches the head of the user.

Other objects and features of the invention, some of them ancillary to those already mentioned, will be apparent from the following description and the appended claim.

In accordance with an exemplary embodiment of the invention, there is provided a forehead lamp device for doctors comprising a light-weight head band or strap of a suitable relatively stiff plastic material, a metal support bracket attached to the head band in such a way (as by means of another plastic member cemented, heat-sealed, or otherwise secured to the band, for example) that no metal portion touches the inside of the band where it can contact the head, and a mirror and lamp housing movably carried by the support bracket. Plastic conduits or guides are fastened to the head band in order to provide a support for wires from the lamp in the housing to portable batteries carried elsewhere on the doctor's person. The conduits or guides are attached to the band by heat-sealing, for example, so that no metal stud or rivet head appears on the inner surface of the head band. By the improved construction of the preferred embodiment of the present invention, metal parts are provided where the necessary stiffness, conductivity or reflectability of metal are necessary but no metal is used in any part which touches the head of the doctor. This is a very important feature since the perspiration of many people reacts with metal to leave a mark on the skin and, moreover, the plastic surface can be kept more readily in a clean, hygienic condition than metal.

Figure 1:
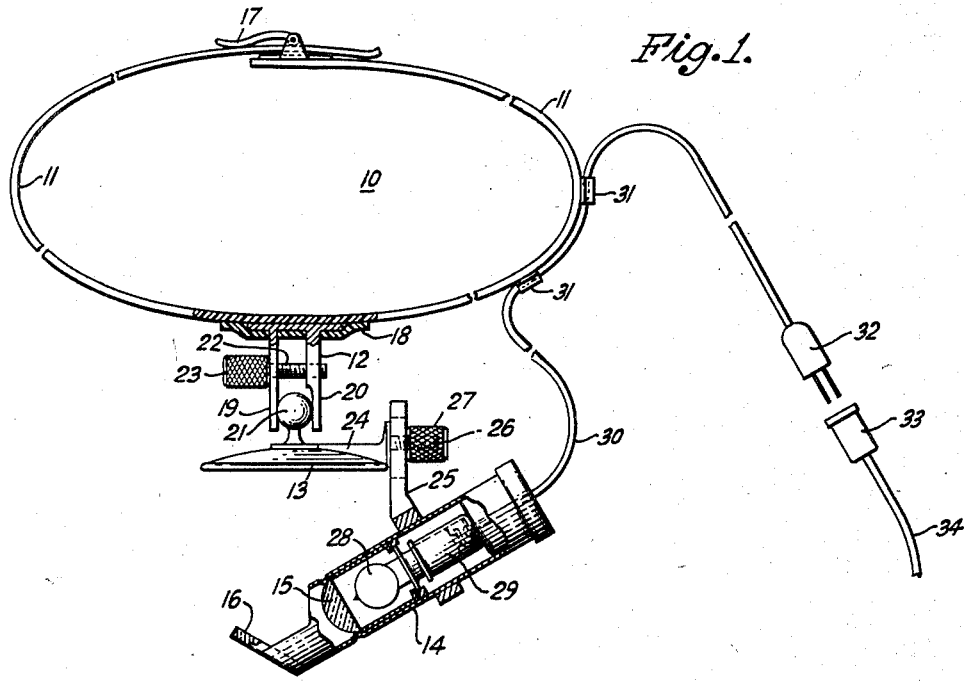
Figure 2:
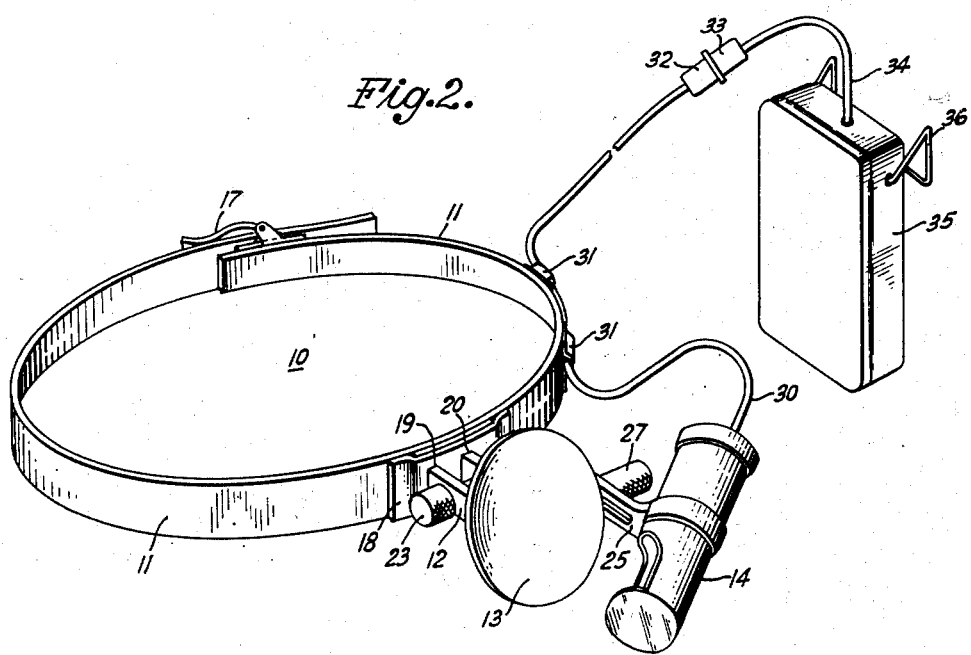

The invention will be more readily understood by referring to the following description taken in connection with the accompanying drawing forming a part thereof, in which:

Fig. 1 is a plan view, with portions broken away to show interior details, of a forehead lamp device in accordance with the invention; and Fig. 2 is a front perspective view of the arrangement of Fig. 1.

Referring more specifically to the drawing, Figs. 1 and 2 show, by way of example for purposes of illustration, a forehead lamp device 10 for doctors constructed in accordance with the invention. The device 10 includes a head band or strap 11 of any suitable non-metallic material, such as the thermoplastic material Vinylite, for example, a metal support bracket 12 attached to the band and to which is movably supported a mirror 13, and a lamp housing 14 having as a part thereof an optical system, comprising a lens 15 and mirror 16, which cooperates with the mirror 13 to form a relatively small, uniformly and brightly illuminated spot of light on the patient.

The head band 11 can be adjusted to any desired head size by the buckle 17 which preferably has no metal parts on the inside of the band 11. For example, the buckle 17 may be of non-metallic material such as plastic or it may have metallic parts attached to the band 11 in such a way that no metal parts project through to the inside of the band. At the front portion of the band 11, the support bracket 12, of any suitable light-weight metal such as aluminum, for example, is attached thereto by means of a plastic member 18 which has holes through which the two post members 19 and 20 of the support bracket 12 project and which is fastened to the band 11 by heat-sealing, cement, etc. In this way, the support member 12 may be of metal (and its consequent rigidity utilized) and still no part thereof can touch the head of the doctor.

Between the two post members 19 and 20 is positioned a ball 21 to which is connected the concave enlarging reflector mirror 13. By means of the fastening screw 22 having an enlarged knurled head 23, the ball joint can be tightened or loosened as desired. Attached to the mirror 13 is the arm 24 to which is secured the support 25 for the lamp housing 14. A screw 26 is fastened to or forms a part of member 24 and this passes through a hole in the support 25, a knurled head 27 being provided for fastening and adjusting purposes.

The lamp housing 14 is movably mounted within a circular opening in the support 25. The housing surrounds a lamp 28 and its socket 29 and provides a mounting for a lens 15 and the mirror 16 of the type which dentists customarily use. Wires 30 from the socket 29 pass out of the housing 14 through a suitable opening therein and are held in place on the band 11 by means of plastic conduits or guides fastened to the band 11 by heat-sealing or cement or may form an integral part of the band. The wires 30 are connected to a terminal member 32 which makes contact with a complemental terminal member 33 to which wires 34 leading to battery case 35 are connected. The battery case is made of light-weight material such as aluminum or plastic, for example, and is provided with a hook or hooks 36 to enable the doctor to attach it on a belt or pocket. By disconnecting the junction 32, 33, the batteries can be saved while not in use.

In operation, the doctor places the band 11 around his head and adjusts the ball joint 21 so that the position of the mirror 13 and lamp housing 14 can be placed in the desired position. The screw 23 can be tightened when the proper adjustment is reached. The position of the housing 14 with respect to the mirror 13 is adjusted by means of the screw head 27. The light from the lamp 28 is directed on the inclined mirror 16 by means of the lens 15 and reflected by this mirror onto the mirror 13 which reflects the light forward past the housing 14 and produces a clear, bright spot of light on the patient.

Various changes can be made in the embodiment described above without departing from the spirit of the invention, the scope of which is indicated by the appended claim.

What is claimed is:

A forehead lamp device for doctors comprising a head band of plastic material, a metallic support bracket having two forwardly extending post members, a plastic member having holes therein through which said post members project when the bracket is positioned outside of the front portion of said band, said plastic member being attached to said band, and a concave reflecting mirror and lamp housing attached to said support bracket.

HAROLD GELLMAN.

REFERENCES CITED

The following references are of record in the file of this patent:

UNITED STATES PATENTS

| Number | Name | Date |
| --- | --- | --- |
| 1,262,065 | Lee | Apr. 9, 1918 |
| 1,530,402 | Parker | Mar. 17, 1925 |
| 1,857,095 | Glowacki | May 3, 1932 |
| 2,088,735 | Everhards | Aug. 3, 1937 |